United States Patent Office 3,147,231
Patented Sept. 1, 1964

3,147,231
PREPARATION OF A CATALYST COMPRISING IRON SELENIDE DISPERSED ON A POROUS SUPPORT
Walter R. Knox, El Dorado, Ark., assignor to Monsanto Company, St. Louis, Mo., a corporation of Delaware
No Drawing. Filed Jan. 4, 1960, Ser. No. 1
6 Claims. (Cl. 252—439)

The present invention relates to the catalytic conversion of hydrocarbons, and more particularly, to the conversion of paraffin hydrocarbons to aromatic hydrocarbons by contacting said paraffin compounds under suitable reaction conditions with a catalyst capable of dehydrogenation and cyclization of said paraffin compounds to aromatic hydrocarbons.

A demand for high purity aromatic hydrocarbons in the plastics, automotive, and other industries is placing an increasing emphasis on new and improved methods of aromatic synthesis. Also the increasing demand for high octane fuels by the automotive industry is causing the economic value of low octane valued n-paraffin hydrocarbons to decrease. Therefore, it is logical that methods of converting the lower valued n-paraffin hydrocarbons to the higher valued aromatic hydrocarbons would receive considerable attention.

The method of converting paraffin hydrocarbons to aromatic hydrocarbons is known as dehydrocyclization since both dehydrogenation and cyclization take place in the conversion. The temperatures required for dehydrocyclization fall within a range in which hydrocarbon cracking reactions may also occur. Therefore, for dehydrocyclization it is necessary to have a catalyst which will cause the formation of aromatic hydrocarbons from paraffin rather than cause only cracking of the paraffin hydrocarbons.

Numerous catalysts are known in the art which relate to the conversion of n-paraffin hydrocarbons to aromatic hydrocarbons. The majority of these catalysts consist of combinations of one or more of the oxides of the metals in the left hand columns of Groups IV, VI, and VI of the periodic table along with alumina or other suitable supports. Small percentages of rare earth oxides and/or Group I alkali metal oxides are often used as promoters for these catalysts. Noble metals and cobalt or nickel oxides are also known in the art to cause some degree of dehydrocyclization when used alone or in combination with one or more of the above listed catalyst components.

It is an object of this invention to provide a new and novel catalyst. It is a more particular object of this invention to provide a new and novel catalyst for the dehydrocyclization of paraffinic hydrocarbons such as n-paraffins to aromatic hydrocarbons. It is yet a further object of this invention to provide a new and novel catalyst comprising an iron selenide on a suitable porous support. Another particular object of this invention is to provide a method for the preparation of a contact material bearing iron selenide. It is yet a further particular object of this invention to provide a method of preparation of a dehydrocyclization catalyst comprising an iron selenide on a suitable support. Additional objects will become apparent from the description of the invention.

In fulfillment of the above set forth objects, this invention is concerned with the dehydrocyclization of paraffinic hydrocarbons to aromatic hydrocarbons using as a catalyst, one comprising iron selenide on a catalyst support of a surface area of 50 to 400 square meters per gram and an average pore diameter of at least 40 angstroms. The method of preparing this catalyst is by liquid impregnation of the support with a soluble iron salt which when thermally decomposed yields metallic iron, followed by reduction and then treatment of the iron impregnated support with vapors of metallic selenium.

The following examples specifically illustrate the invention described herein. These examples are not, however, to be in any manner construed as limiting the objects, application, or conditions of the invention herein set forth.

Example I

The catalyst is prepared by treating 5/32 inch diameter alumina pellets of 225 to 250 square meters per gram surface area with an aqueous ferric nitrate solution of sufficient concentration to place about 4.4 weight percent iron on the support. The ferric nitrate impregnated alumina is dried for approximately 8 hours at 130 to 160° C. The catalyst is then calcined at 550° C. for approximately 16 hours in air or nitrogen atmosphere. Other inert and oxygen containing atmospheres may be used. This is followed by reduction for 1½ hours at 500° C. with cylinder hydrogen. The catalyst is then packed in a reaction chamber and ¼ inch very low surface area Alundum heat exchange pellets placed over the catalyst to a depth of 6 inches. Selenium metal is then added to the heat exchange pellets above the catalyst as a powder. This section is then heated to 600° C. and the section containing the iron impregnated alumina is heated to 550° C. Nitrogen is passed through the reactor for approximately one hour. The amount of ferrous selenide present on the catalyst amounts to approximately 10 weight percent of the catalyst.

A feed comprising a technical grade n-hexane containing 95 mol percent n-hexane, 0.6 mol percent methylcyclopentane, 0.3 mol percent benzene, and 4.1 mol percent 3-methyl pentane is contacted with the above described catalyst at a reaction temperature of 570° C. and at a liquid hourly space velocity of one. The resultant product contains 22.0 volume percent benezene.

The preparation of the catalyst is further illustrated by the following examples.

Example II

A gel type alumina of ⅛ inch diameter pellets with 225 square meters per gram surface area and an average pore diameter of 80 angstroms is impregnated with a solution of ferric acetate in ethyl alcohol of such concentration that a 6 weight percent equivalent of iron is deposited on the catalyst as ferric acetate. This catalyst is dried in a vacuum oven at 80° C. four two hours and then transferred to a reactor where it is calcined at 550° C. with nitrogen flow equivalent to a gaseous hourly space velocity of 200. Air is then passed over the catalyst for 30 minutes at the same temperature and gaseous flow rate as the nitrogen The reactor is then purged 5 minutes with nitrogen and allowed to cool to 500° C. Cylinder hydrogen is then passed over the catalyst at a gaseous hourly space velocity of 200 for one hour. A selenium container equiped with a dip tube and a top exit above the level of selenium is connected to the reactor by heated lines. The selenium is melted and heated to 600° C. Nitrogen is passed through the selenium liquid by introduction through the dip tube. The selenium saturated nitrogen gas so produced is passed over the catalyst maintained at 550° C. for a sufficient period to cause the catalyst to gain an amount of selenium equivalent to 7.6 weight percent of the catalyst. This finished catalyst contains approximately 13.6 weight percent ferrous selenide. It may be used for dehydrocyclization of paraffin hydrocarbons in a manner similar to that described in Example I. Aromatic yields are comparable to those in Example I.

Example III

This catalyst is prepared in the manner of that described in Example I using an alumina prepared by the Bayer alumina process. This alumina has a surface area of 125 square meters per gram and an average pore diameter of 160 angstroms. The equivalent of 3.5 weight percent iron is applied from a ferric nitrate solution. After decomposition to metallic iron, enough selenium is added as in Example I to produce a catalyst with 8.75 weight percent ferrous selenide on the alumina. The activity of this catalyst is comparable to that of Example I in paraffin dehydrocyclization.

The iron selenide catalyst is prepared by impregnating the support with an iron compound suitably dissolved in a solvent such as water, alcohols, ethers, etc. The iron compound should be one which is thermally decomposable at temperatures below about 650° C. The iron decomposition product should be a compound such as an oxide which can be reduced in a hydrogen atmosphere at temperatures below 650° C. Following the thermal treatment the iron compound impregnated support is reduced in a hydrogen stream to produce metallic iron on the support surface. Vapors of selenium are then passed over the supported iron at a temperature from 450 to 650° C. to cause a surface chemical reaction between metallic iron and metallic selenium. The product of this reaction is the finished catalyst of the present invention, iron selenide, i.e., ferric selenide, ferrous selenide.

The methods by which the iron may be placed upon the support include co-gelation and co-precipitation techniques as well as impregnation. The iron compound placed on the support need not of necessity be one thermally decomposable to an intermediate product since the essence of the invention requires only that the reduction step produce metallic iron in a form suitable for surface reaction with selenium vapors at elevated temperatures. The selenium vapors may be introduced by such techniques as pressure, vacuum or gas entrainment techniques with appropriate mechanical equipment in each.

The amount of iron selenide present on the catalyst support may range from 3 to 30 weight percent of the total finished catalyst weight. A preferred range, however, is from 5 to 20 weight percent. The relative molar quantities of iron and selenium in the catalyst may vary from 0.5:1 to 2:1. The preferred ratio, however, is 1:1.

The catalyst support is preferably an alumina with a surface area of approximately 225 to 250 square meters per gram and an average pore diameter of at least 80 angstroms, the upper pore diameter limit being controlled by mechanical strength demands of the reaction being used. Other high surface area catalyst supports can be used in the practice of this invention. The supports may have surface areas from approximately 50 to 400 square meters per gram and average pore diameters of from 40 to 320 angstroms.

In carrying out the process of this invention a suitable temperature must be maintained in the dehydrogenation-cyclization zone. This temperature may be in the range of 510 to 590° C. but more preferably in the range of 540 to 575° C. The optimum yield is very closely related to the space velocity. As the space velocity is increased the optimum yield temperature will also increase. The space velocity may range from 0.1 to 2.0 volumes of liquid feed per hour per volume of catalyst. The preferred rate is approximately 0.5 to 1.0 volume liquid feed per hour per volume of catalyst.

The preferred feed stock anticipated for use with the catalyst described herein is one containing an approximate minimum of 90 mol percent n-paraffin hydrocarbons and a naphthene hydrocarbon content maximum of 5 mol percent. This is not to say the invention will not operate with lower n-paraffin and/or higher naphthene concentrations, but the efficiency of the reaction is impaired as the composition is deviated beyond these limits. A low naphthene content is desirable because of the carbon forming tendency of the naphthenes under the relatively severe operating conditions necessary for the dehydrocyclization of n-paraffin hydrocarbons. The lower the naphthene concentration, the longer the reaction may be carried out without a shutdown for regeneration. The n-paraffin hydrocarbons which may be used in the practice of this invention contain at least 6 carbon atoms and preferably 6 to 12 carbon atoms. This includes n-hexane, n-heptane, n-octane, n-nonane, n-decane, n-undecane, and n-dodecane. Branched chain hydrocarbons, preferably slightly branched hydrocarbons, of at least 6 carbon atoms, e.g., from 6 to 12 carbon atoms, in one chain also may undergo dehydrocyclization with this invention. Examples of such branched chain paraffin hydrocarbons are methyl hexanes, methyl heptanes, dimethyl hexanes, dimethyl heptanes, ethyl heptanes, etc.

The method of contacting the catalyst with the feed may involve either adiabatic or isothermal operations in a fixed, moving or fluidized bed. The fluidized bed may be of the single vessel container or multi-vessel circulating type. Those skilled in the art will see that a wide variety of mechanical designs of each of these types may serve to carry out the desired aromatic production.

I claim:
1. The process of preparing a catalyst comprising iron selenide dispersed on a porous support of 50 to 400 square meters per gram surface area and an average pore diameter of 40 to 320 angstroms, the process comprising dispersing metallic iron upon the surface of the porous support by impregnation from a solution of an iron compound in a solvent, said iron compound being one reducible to metallic iron at a temperature below 650° C., followed by reduction of the iron compound impregnated support in hydrogen to yield metallic iron dispersed on the support, and then contacting the supported metallic iron with gaseous elemental selenium at a temperature of 450 to 650° C. to cause a surface chemical reaction between the metallic iron and gaseous elemental selenium to produce an iron selenide catalyst.

2. The process of claim 1 wherein the iron compound is ferric nitrate.

3. The process of claim 1 wherein the iron compound is ferric acetate.

4. The process of claim 1 wherein the catalyst support is alumina.

5. The process of claim 1 wherein the method of introducing gaseous selenium comprises passing an inert gas through metallic selenium in a molten state, and then passing the selenium saturated inert gas through a catalyst bed containing a catalyst support bearing metallic iron dispersed upon its surface.

6. The process of claim 1 wherein the method of introducing gaseous selenium comprises passing selenium vapors under reduced pressure through a catalyst bed containing a catalyst support bearing metallic iron dispersed upon its surface.

References Cited in the file of this patent

UNITED STATES PATENTS

| | | |
|---|---|---|
| 2,331,292 | Archibald et al. | Oct. 12, 1943 |
| 3,013,090 | Hochwalt et al. | Dec. 12, 1961 |

FOREIGN PATENTS

| | | |
|---|---|---|
| 625,330 | Great Britain | June 27, 1949 |
| 658,240 | Great Britain | Oct. 3, 1951 |

OTHER REFERENCES

Berkman et al.: "Catalysis," Reinhold Publishing Corp., New York, 1940, page 944.

Mellor: "A Comprehensive Treatise on Inorganic and Theoretical Chemistry," vol. 10, Longmans, Green and Company, New York, 1930, page 799.

Partington: "Textbook of Inorganic Chemistry," Macmillan & Co., London, 1950, 6th edition, page 499.